Figure 1:
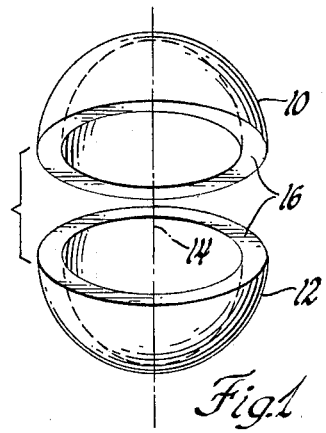

Sept. 27, 1966   A. T. NORDSIECK   3,274,666
METHOD OF PRODUCING A SPHERICAL GYRO ROTOR
Filed May 26, 1965

INVENTOR.
Arnold T. Nordsieck
BY
Hugh L. Fisher
ATTORNEY

United States Patent Office 3,274,666
Patented Sept. 27, 1966

3,274,666
METHOD OF PRODUCING A SPHERICAL GYRO ROTOR
Arnold T. Nordsieck, Santa Barbara, Calif., assignor to General Motors Corporation, Detroit, Mich., a corporation of Delaware
Filed May 26, 1965, Ser. No. 459,011
7 Claims. (Cl. 29—148.4)

This invention relates to methods of forming bodies of predetermined shape and more particularly to a method of producing a body which, through centrifugal distortion, assumes a spherical shape when rotated about a predetermined design axis at a relatively high design angular rate.

Due to the currently substantial interest shown in the use of a gyroscope as an inertial navigation device, efforts have been directed toward the improvement of gyroscopic accuracy and stability. One major area in which such an improvement has been investigated is the means by which the gyro rotor is supported and further in the configuration of the rotor itself. Errors due to bearing inaccuracies may be eliminated through the use of a spherical ball-type rotor which is supportable relative to a frame of reference by means of a fluid cushion, magnetic or electric field or other means which do not require physical contact between the rotor and the surrounding environment.

To perform the gyroscopic functions, a spherical ball-type rotor must be rotated at a relatively high speed about a predetermined design axis. Any mass unbalances, surface irregularities or non-sphericity caused by centrifugal distortion is highly detrimental to the performance of a gyro using such a rotor. Therefore, it is of great importance to produce a rotor which assumes as nearly as possible a state of perfect sphericity when rotated about the design axis at the relatively high design speed.

The present invention is accordingly directed toward a method for producing a body which assumes as nearly as possible a perfectly spherical shape when rotated about a predetermined design axis at a relatively high design speed. The body which may be produced through the present method is especially adapted for, but not limited to, use as a rotor in an advanced gyroscope. The method generally involves the rough forming of an essentially spherical body of substantially uniform density material. This rough body is then mounted for rotation successively about a plurality of randomly oriented axes at a relatively low speed. During this rotation surface irregularities and nonuniformities are detected by suitable means and corrected by altering or modifying the quantity of material on the surface of the spherical body so as to produce a body which is, as nearly as possible, perfectly spherical, balanced and exhibits no surface irregularities. The body is then brought up to the predetermined design speed at which a certain amount of centrifugal distortion is experienced causing the body to assume an oblate shape. While rotating at the design speed, the depressed areas at the poles of the body are detected and eliminated by the properly monitored addition or removal of material thereby to produce a body which is as nearly as possible perfectly spherical when rotated at the design speed.

Figure 2:
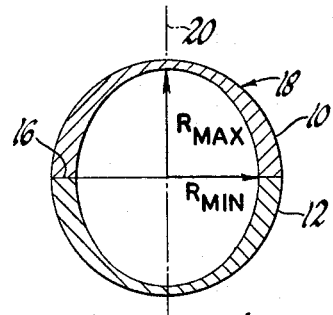
Figure 2A:
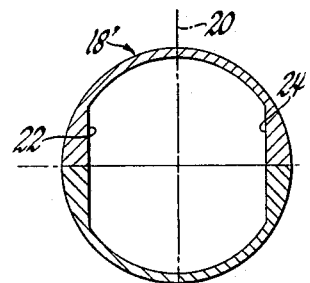
Figure 3:
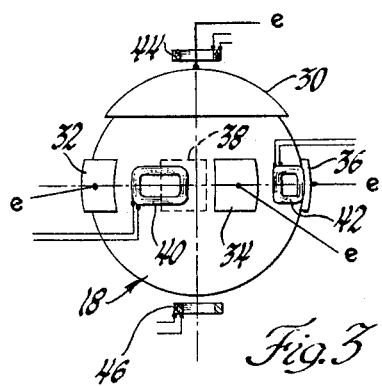
Figure 4:
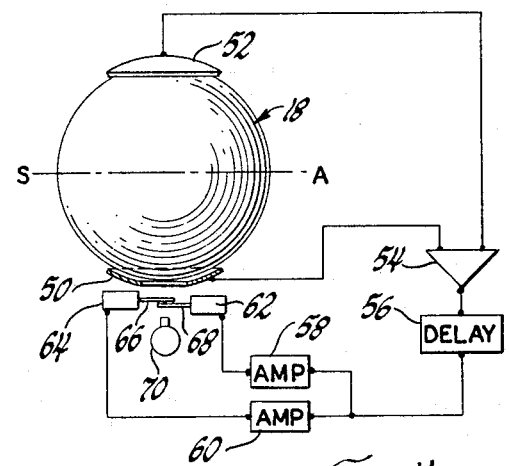
Figure 5:
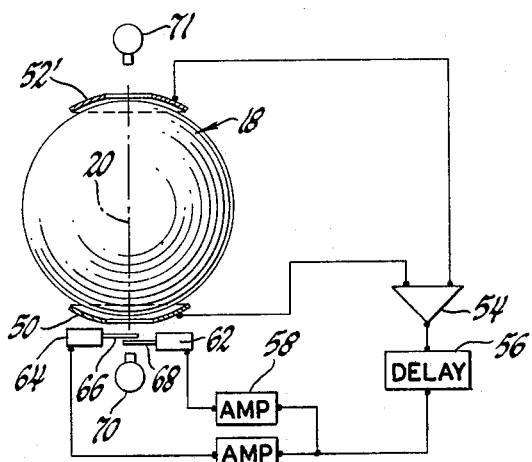

This method, as well as the means for carrying it out, may be best understood by reference to the following specification and the accompanying drawings of which:

FIGURE 1 shows two hemispheres which may be produced as a step in the method;
FIGURE 2 is a cross-sectional view of a rough spherical body illustrating a first design;
FIGURE 2A is a cross-sectional view of a rough spherical body showing a second design;
FIGURE 3 shows a suspension and torquing system which may be used in carrying out the subject method;
FIGURE 4 is a schematic diagram of a capacitive system for detecting surface irregularities and mass unbalances in the rough spherical body and for correcting these irregularities and unbalances; and
FIGURE 5 is a schematic diagram of a system for detecting the polar depressions and for eliminating the depressions while the body is rotated at the design speed.

In the following specification, a method for producing a hollow, metallic body which assumes a spherical shape when rotated about a preferred design axis at a relatively high design speed is described. This method includes steps of forming, preferably by section, a rough spherical body of a dimensionally stable material such as beryllium, and successively rotating the body about a plurality of randomly oriented axes at a relatively low speed while suspended in a soft suspension system such as a magnetic or electrostatic system. During the slow rotation the static sphericity of the body is substantially perfected by sensing, through means such as inductive or capacitive surface displacement sensors, surface irregularities and mass unbalances producing wobble and either adding to or subtracting from the material in the surface of the body. Although material may be either removed by means such as an electron blast or added by means such as a vapor depositing technique, the latter technique is preferred. After perfecting the static sphericity of the body, it is then rotated about a design axis at a relatively high design speed. During this high speed rotation the centrifugally caused depressions at the poles of the body are detected and eliminated preferably by the addition of material to the depressed poles. According to this final step, the dynamic sphericity of the body is perfected such that it assumes a spherical shape when rotated at the design speed.

Referring to FIGURE 1, the method of fabricating a spherical body of the stated characteristics may be begun by machining out of good quality beryllium two substantially identical hemispheres 10 and 12 each of which has a major axis indicated at 14. The hemispheres may be fabricated from any material which exhibits a substantially uniform density and substantially pure elasticity within a stress range which will be prescribed by the use to which the particular body is put. Good quality beryllium has been found to be particularly suitable for these purposes and thus is preferred for the fabrication of hemispheres 10 and 12. Since a maximum degree of mirror symmetry with respect to the equatorial plane normal to the major axis 14 is desired, the hemispheres 10 and 12 may be matched by weight.

Referring to FIGURE 2, the hemispheres 10 and 12 may be joined at the annular planar surfaces shown at 16 by a suitable method such as welding or brazing. An electron beam vacuum welding technique may be preferred since such a technique allows intense and concentrated heating of the surfaces at 16 without appreciably heating the bulk of the hemispheres 10 and 12. When joined, as shown in FIGURE 2, the hemispheres 10 and 12 form a roughly spherical body 18 having a preferred design axis of rotation 20. A vacuum tight joint at 16 is preferred. Accordingly, the welding or brazing process employed to join the hemispheres 10 and 12 to form the spherical body 18 may be preferably carried out in a vacuum. The design axis 20 may be established by machining the hemispheres 10 and 12 such that the wall thickness of the beryllium body 18 varies from a minimum thickness at the poles taken along design axis 20 to a minimum thickness at the equator of the body 18, as shown in FIGURE 2. Accordingly, the spherical body 18 is characterized by a substantially constant outer radius and an inner radius which is a maximum $R_{max}$ when measured along the major or design axis 20 and a minimum $R_{min}$ when measured, as shown in FIGURE 2, in a plane normal to the major or design axis 20.

FIGURE 2 shows the inner radius as varying uniformly from a maximum along the axis 20 to a minimum along the equatorial plane. FIGURE 2A shows an alternative configuration for a spherical body 18'. In this alternative configuration, the dimensions of the body are again characterized by a substantially constant outer radius and an inner radius which is a maximum along the axis 20 and a minimum along the equatorial plane. However, the inner radius may vary abruptly at a predetermined angle from the design axis 20 to form substantially vertically planar inner surfaces 22 and 24. The alternative embodiments shown in FIGURES 2 and 2A both exhibit the desired characteristic of a perferred design axis of rotation 20 produced by building into the body 18 preferred inertial characteristics.

Having formed a roughly spherical body 18, it is at this point necessary to detect and eliminate surface nonuniformities and mass unbalances which would adversely affect the performance of a gyroscope system within which the spherical body 18 may be employed as a rotor. This is accomplished by suspending the body 18 in a soft suspension system and rotating the body 18 successively about a number of randomly oriented axes and during this rotation detecting surface nonuniformities and mass unbalances and adding material to the surface of the body 18 to correct these undesirable nonuniformities and mass unbalances. As shown in FIGURE 3, an electrostatic suspension system may be employed to support the spherical body 18 out of physical contact with the surrounding apparatus. Systems for electrostatically suspending a spherical body such as 18 are well known in the art. One system for supporting such a body is shown in the patent to Nordsieck 3,003,356 issued October 10, 1961. In the system shown in FIGURE 3, a large spherical cap electrode 30 is disposed directly above the spherical body 18. The electrode 30 conforms to the spherical surface of the body 18 and is placed with respect to the body 18 such that a uniform clearance exists between the inner surface of electrode 30 and the outer surface of body 18. In addition, four smaller electrodes 32, 34, 36 and 38 are placed at 90° intervals about the equator of the body 18 and also located at a uniform distance from the surface thereof. The electrodes 30, 32, 34, 36 and 38 may be supplied with a voltage so as to produce an electric field between the electrodes in the surface of the beryllium body 18. The electric field tends to produce supporting forces for maintaining the body 18 in a position whereby the clearance between the body 18 and the electrodes is uniform. The electrodes may further be connected into a feedback control system for automatically varying the voltage supplied to the electrodes thereby to maintain the body 18 in a reference position. The electrostatic suspension system may be designed such that the effective spring rate of the suspension is small enough so that the resonant frequency of the suspension is well below the rotational frequency of the body 18 when rotated in accordance with the steps to be described below. Under these conditions the rotor body 18 will choose an axis of rotation passing through its own center of mass thus causing any mass unablance in the spherical body 18 to be exhibited as a periodic surface displacement.

FIGURE 3 also shows a system including torquing means including coils 40 and 42 disposed in the equatorial plane and coils 44 and 46 disposed at the axial extremes of the body 18. As will be apparent to those skilled in the inductive drive art, properly phased current through coils adjacent the conductive body 18 produces a rotating magnetic field which tends to rotate the body 18. Any particular speed or axis of rotation may be selected by energizing a particular combination of the coils 40, 42, 44 and 46 for a predetermined time calculated to result in the desired angular displacement. The body may be stopped by reversing the current and a new axis selected by selecting a new combination of coils for energization. By this means the body 18 may be rotated about a sequence of different axes thereby to expose all portions of the body to the sphericizing effect to be described below.

Referring now to FIGURE 4, means are shown for capacitively detecting and correcting surface nonuniformities and mass unbalances in the spherical body 18. This correction is made by capacitively sensing displacements of the surface of the spherical body 18 with respect to a sensing electrode and adding, at the proper time, material to the surface of the body 18 to effectively fill in low spots and substantially prefect the static sphericity of the body 18. As shown in FIGURE 4, two diametrically opposed electrodes 50 and 52 are disposed relative to the surface of the spherical body 18 to a capacitively detect displacements of the surface of the body 18 with respect to the electrodes 50 and 52. The voltage changes detected by the electrodes 50 and 52 are conveyed to an amplifier modulator unit 54 which produces an output signal indicating the presence of a low spot which must be filled in to sphericize the body 18. This signal, after being delayed a suitable time at 56 to allow positioning of the sperical body 18, is applied through identical preamplifiers 58 and 60 to a pair of shutter control mechanisms 62 and 64. The mechanisms 62 and 64 control the position of a pair of shutters 66 and 68, respectively, which open and close a path between a metallic vapor source 70 and the surface of the spherical body 18. The source 70 may be a metallic vapor oven adapted to direct a stream of vaporized antimony or beryllium or other metallic vapor toward the surface of the spherical body 18 to effectively vacuum deposit material on the low spots of the body 18 detected by electrodes 50 and 52.

In this detection step the spherical body 18 is rotated about the spin axis S-A at a relative low speed such as 20 cycles per second. Surface depressions resulting in variations in the distance between the surface of the body 18 and the electrodes 50 and 52 produce capacitive variations and hence signal variations at electrodes 50 and 52. Mass unbalances similarily cause low frequency wobble of the body 18 which produce signal variations which may be electrically distinguished from the surface irregularities. Both surface irregularities and mass unbalances are corrected by employing the signal variations to control shutters 66 and 68 thereby to deposit material from source 70 onto the surface of the body. This process is preferably carried out in a vacuum. After the spherical body 18 has been rotated about the spin axis S-A for a sufficient period of time to have partially corrected low spots existing in the area covered by electrodes 50 and 52, the spin axis of the body 18 may be changed in the manner previously described to partially or fully correct irregularities in another portion of body 18. The body 18 is brought up to 20 revolutions per second by energizing a selected combination of coils in FIGURE 3 for a predetermined time period and the body is allowed to coast during the detection period. This process may be repeated as many times as is necessary to perfect the static sphericity of the body 18. The result of this repeated process is a metallic sphere having substantially no surface irregularities or mass unbalances and further having a preferred design axis of rotation. Although ideally some centrifugal distortion is produced even at the low speed rotation (20 r.p.s.) this distortion is negligible. Thus the body 18 may be considered as statically spherical after the step described above.

Having produced a spherical body 18 with substantially no surface nonuniformities or mass unbalances and further having a design axis of rotation, the next and final step in the overall method is to preshape the body 18 by rotation about the design axis at a relatively high speed, for example, 2000 revolutions per second, and detecting and eliminating the centrifugal distortion of the surface of the body 18 experienced during the high speed rotation. To accomplish this, the spherical body 18 is disposed with respect to electrodes 50 and 52' such that the design axis 20 passes directly through the centers of the electrodes 50 and 52, as shown in FIGURE 5. The body 18 is then brought up to the design speed of 2000 revolutions per second by applying a predetermined current to the torquing coils for a predetermined time. This high speed rotation produces centrifugal distortion tending to flatten out the polar areas of body 18 under the electrodes 50 and 52. This centrifugal distortion causes the polar surfaces of the body 18 to recede from the electrodes 50 and 52, causing signals to be presented to the modulation amplifier 54 and operating the shutter mechanisms 62, 64 to open the shutters 66 and 68 to allow material from source 70 to be deposited upon the polar surfaces of body 18. As shown in FIGURE 5, it may be desirable to employ a second metal vapor source 71 at a position which is diametrically opposite that of source 70. Accordingly, both polar surfaces might be filled in at the same time.

In order to insure uniform filling in of the polar areas, a very slowly rotating torque may be applied to the body 18 to cause a precession of the design axis 20 at a very low rate such as one revolution in five minutes. This precession effectively exposes the entire areas of the spherical body 18 to the metallic vapor sources 70. Alternatively, the electrodes 50 and 52, the vapor sources 70 and 71 and the accompanying apparatus shown in FIGURE 5 may be rotated slowly about an axis normal to the plane of FIGURE 5. According to either technique, the entire area of body is exposed to detecting electrodes 50 and 52 and material added to the surface of the body. Since the polar areas are depressed, the largest portion of the material is added at the poles with gradually decreasing amounts toward the equatorial plane. As previously described, this final step perfects the dynamic sphericity of the body 18. Accordingly the body 18 assumes a spherical shape when rotated at the design speed (2000 r.p.s.) about the design axis 20.

While the foregoing description has been primarily directed towards a method for fabricating a spherical rotor for a gyroscope, it is to be understood that the process is not limited to the manufacture of an end product which is to be used in a gyroscope. Various other applications of the method will be apparent to those skilled in the art, and hence the foregoing description is not to be construed in a limiting sense. For a definition of the invention reference should be had to the appended claims.

I claim:

1. A method of producing a body which assumes a spherical shape when rotated about a design axis at a relatively high design speed comprising the steps of forming a generally spherical body of substantially uniform plurality of randomly oriented axes at a relatively low density material, successively rotating the body about a speed, sensing, during the low speed rotation, surface nonuniformities and prefecting the static sphericity of the body by eliminating the surface nonuniformities sensed, rotating the body about the design axis at the design speed, sensing the centrifugal distortion in the body and altering the quantity of material in the surface of the body thereby to perfect the dynamic sphericity of the body at the design speed.

2. A method of producing a body which assumes a spherical shape when rotated about a design axis at a relatively high design speed comprising the steps of foming a generally spherical body of substantially uniform density material, successively rotating the body about a plurality of randomly oriented axes at a relatively low speed, detecting, during the low speed rotation, low areas in the surface of the body and mass unbalances in the body, depositing material on the surface of the body to perfect the static sphericity thereof in accordance with the low areas and mass unbalances detected, rotating the body about the design axis at the design speed, and sensing and eliminating the depressed poles of the body caused by centrifugal distortion thereby to perfect the dynamic sphericity of the body at the design speed.

3. A method of producing a body which assumes a spherical shape when rotated about a design axis at a relatively high design speed comprising the steps of forming two substantially identical hemispheres of substantially uniform density material, joining the hemispheres to form a substantially spherical body, successively rotating the body about a plurality of randomly oriented axes at a relatively low speed, sensing, during the low speed rotation, surface nonuniformities and perfecting the static sphericity of the body by eliminating the surface nonuniformities sensed, rotating the body about the design axis at the design speed, sensing the centrifugal distortion in the body and altering the quantities of material in the surface of the body thereby to perfect the dynamic sphericity of the body at the design speed.

4. A method of producing a body which assumes a spherical shape when rotated about a design axis at a reltively high design speed comprising the steps of forming two substantially identical hemispheres of substantially uniform density metal, joining the hemispheres to form a substantially spherical body, detecting, during the low speed rotation, low areas in the surface of the body and mass unbalances in the body, depositing material on the surface of the body to perfect the static sphericity thereof in accordance with the low areas and mass unbalances detected, rotating the body about the design axis at the design speed, and depositing material on the body to eliminate the polar depressions caused by centrifugal distortion thereby to perfect the dynamic sphericity of the body at the design speed.

5. A method of producing a body which assumes a spherical shape when rotated about a design axis at a relatively high design speed comprising the steps of forming two substantially identical hemispheres of uniform density material each having a constant outer radius and an inner radius which is a maximum taken along the major axis and a minimum taken in a plane normal to the major axis, joining the two hemispheres to form a substantially spherical body in which the major axes of the component hemispheres jointly define a design axis, sensing, during the low speed rotation, surface nonuniformities and perfecting the static sphericity of the body by eliminating the surface nonuniformities sensed, rotating the body about the design axis at the design speed, and depositing material on the body to eliminate the polar depressions caused by centrifugal distortion thereby to perfect the dynamic sphericity of the body at the design speed.

6. A method of producing a body which assumes a spherical shape when rotated about a design axis at a relatively high design speed comprising the steps of forming two substantially identical hemispheres of uniform density metal each having a constant outer radius and an inner radius which is a maximum taken along the major axis and a minimum taken in a plane normal to the major axis, joining the two hemispheres to form a substantially spherical body in which the major axes of the component hemispheres jointly define a design axis, detecting, during the low speed rotation, low areas in the surface of the body and mass unbalances in the body, depositing material on the surface of the body to perfect the static sphericity thereof in accordance with the low areas and mass unbalances detected, rotating the body about the design axis at the design speed, and depositing material on the body to eliminate the polar depressions caused by centrifugal distortion thereby to perfect the dynamic sphericity of the body at the design speed.

7. A method of producing a body which assumes a spherical shape when rotated about a design axis at a relatively high design speed comprising the steps of forming a substantially spherical hollow metal body having a constant outer radius and an inner radius which varies from a maximum taken along the design axis to a minimum taken in an equatorial plane normal to the design axis, successively rotating the body about a plurality of randomly oriented axes at a relatively low speed, detecting during the low speed rotation, low areas in the surface of the body and mass unbalances in the body, depositing material on the surface of the body to perfect the static sphericity thereof in accordance with the low areas and mass unbalances detected, rotating the body about the design axis at the design speed, and depositing material at the depressed poles of the body caused by centrifugal distortion thereby to perfect the dynamic sphericity of the body at the design speed.

No references cited.

JOHN F. CAMPBELL, *Primary Examiner.*

T. H. EAGER, *Assistant Examiner.*